United States Patent [19]

Lehr et al.

[11] 4,212,963

[45] Jul. 15, 1980

[54] POLYBUTYLENE TEREPHTHALATES HAVING A LOW CARBOXYL CONTENT AND CONTINUOUS PROCESS FOR THE PRODUCTION THEREOF

[75] Inventors: Günter Lehr; Rudolf Binsack, both of Krefeld, Fed. Rep. of Germany

[73] Assignee: Bayer Aktiengesellschaft, Leverkusen, Fed. Rep. of Germany

[21] Appl. No.: 968,892

[22] Filed: Dec. 13, 1978

Related U.S. Application Data

[63] Continuation-in-part of Ser. No. 829,384, Aug. 31, 1977, abandoned.

[30] Foreign Application Priority Data

May 4, 1977 [DE] Fed. Rep. of Germany ....... 2719969
Aug. 3, 1977 [DE] Fed. Rep. of Germany ....... 2734924

[51] Int. Cl.$^2$ .............................................. C08G 63/18
[52] U.S. Cl. ..................................... 528/272; 528/302; 528/307; 528/309; 528/483
[58] Field of Search ............... 528/272, 273, 302, 307, 528/309, 483, 296

[56] References Cited

U.S. PATENT DOCUMENTS

| | | | |
|---|---|---|---|
| 3,550,669 | 12/1970 | Lippert et al. ............................ | 159/6 |
| 3,692,744 | 9/1972 | Rich et al. ............................. | 528/296 |
| 3,834,441 | 9/1974 | Vernaleken et al. ................... | 159/49 |
| 3,859,257 | 1/1975 | Schade et al. .......................... | 526/71 |
| 3,953,404 | 4/1976 | Borman ................................. | 528/273 |
| 4,056,514 | 11/1977 | Strehler et al. ....................... | 528/274 |

*Primary Examiner*—Lucille M. Phynes
*Attorney, Agent, or Firm*—Gene Harsh; Lawrence S. Pope

[57] ABSTRACT

Polybutylene terephthalates having a narrow molecular weight distribution, a low carboxyl group content and an intrinsic viscosity of from 0.2 to 1.4 dl/g can be continuously produced by transporting a molten reaction mixture of terephthalic acid mono- and/or bis-(hydroxybutyl) ester or low viscosity polybutylene terephthalate at 160° to 300° C., together with a heated inert gas, in a diphasic annular stream through an externally heated spiral reaction tube (of substantially constant pitch) having a diameter of from 3 to 100 mm and a diameter/length ratio of from 1:400 to 1:2000 by the maintenance of a pressure difference between the beginning and the end of the reaction tube, under conditions such that the absolute pressure, determined at the point of entry of the reaction mixture into the tube, is from 1 to 100 bar and the viscosity of the annular stream is from 1 to 10,000 poises (determined at the reaction temperature), and a circular stream between the surface of the melt and the wall of the tube is produced by the curvature of the tube and a stream of gas flowing at a velocity of from 20 to 300 m/sec to accelerate the transport of material between the melt and the inert gas, whereby the reaction takes place in the liquid phase and/or at the melt/gas interface.

6 Claims, 1 Drawing Figure

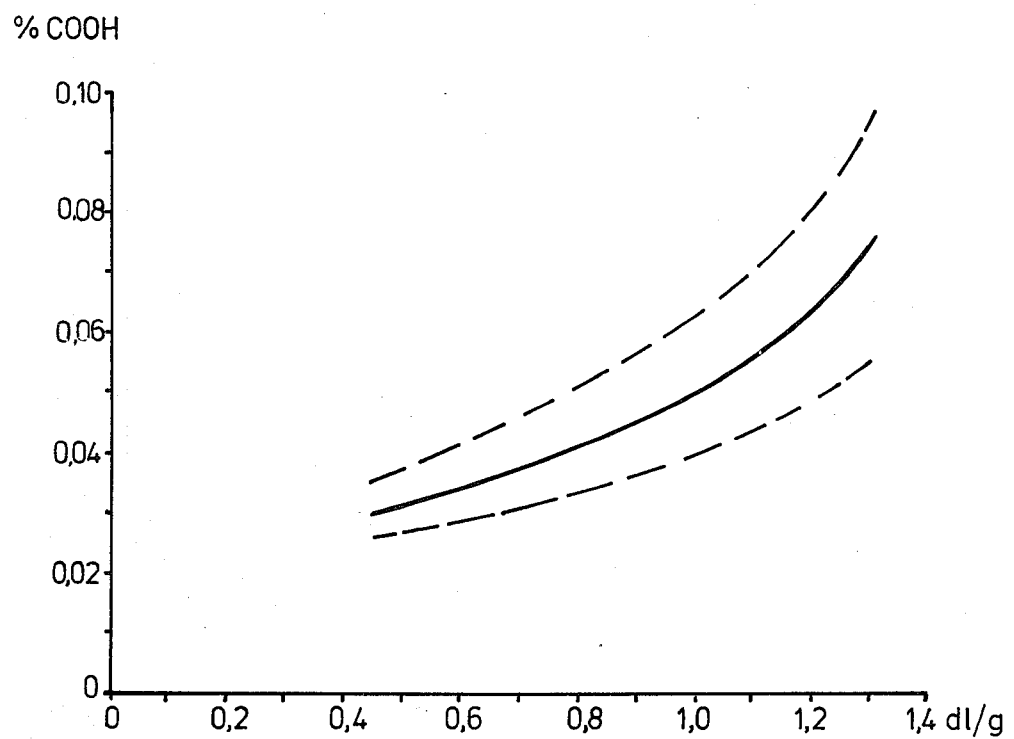

POLYBUTYLENE TEREPHTHALATES HAVING A LOW CARBOXYL CONTENT AND CONTINUOUS PROCESS FOR THE PRODUCTION THEREOF

This application is a continuation-in-part-application of our application Ser. No. 829,384, filed Aug. 31, 1977, now abandoned.

This invention relates to polybutylene terephthalates having a narrow molecular weight distribution, a low carboxyl group content and an intrinsic viscosity of from 0.2 to 1.4 dl/g and to a continuous process for their production in a two-phase flow tube.

Polybutylene terephthalates have gained rapid access to numerous technical fields by virtue of their excellent mechanical properties and the ease with which they can be processed.

Apparatus both for continuous and for batch processes for the production of polyesters are already known. German Auslegeschrift No. 1,495,587, for example, describes an apparatus for the post-condensation of a precondensate which has been prepared by ester condensation. This apparatus consists of a tubular reactor having two condensation chambers, placed above one the other, which can be heated and evacuated to different pressures. The upper part of the upper chamber has an inlet for the precondensate and overflows which subdivide the chamber into individual sections. This chamber is separated from the lower chamber by a liquid seal which is formed by the condensate. The lower chamber has baffle plates arranged under the seal and an outlet for the post-condensed polyester. In a preferred embodiment of this apparatus, the chambers are attached to two different vacuum pipes with cooling traps.

An apparatus for the polycondensation of liquid precondensates has also been described in German Auslegeschrift No. 1,645,630. This apparatus consists of a reaction vessel comprising an upper and a lower region and having a rotatable shaft with a stirrer device arranged horizontally in the vessel. An attachment for connection to a source of reduced pressure for removing the vapors from the vessel is provided in the upper part of the vessel. The apparatus is characterized in that a plurality of partitions is provided in the lower region of the vessel to form chambers situated horizontally side by side, which partitions have apertures for the passage of liquid, in that the stirrer device consists of a plurality of stirrer blades attached at equal intervals to the shaft, and in that an inlet and an outlet for liquid are provided in the lower region.

The main disadvantage of the processes carried out in these apparatus lies in the relatively long residence time of the reaction mixture in the reactor, which causes a considerable proportion of butane diol to be irreversible converted into tetrahydrofuran if the apparatus is used for the preparation of butylene terephthalates, and resultes in the formation of polybutylene terephthalate degradation products which have a high carboxyl group content, inhibit further polycondensation and result in a reduced thermal stability of the polybutylene terephthalates obtained from the process.

Another disadvantage of the long residence time is the relatively wide range of molecular weights of the obtained polybutylene terephthalates.

Moreover, the use of a vacuum should be avoided as far as possible because it entails the risk of air implosions, especially in large industrial plants. Furthermore, the installations used for producing the vacuum are liable to get blocked by low molecular weight constituents distilling from the apparatus.

According to the invention, these disadvantages can be obviated by carrying out polycondensation in a two-phase flow tube in which thin layers of the molten reaction mixture are produced by means of a circular stream so that high polycondensation velocities and hence short residence times can be achieved.

The present invention provides a continuous process for the production of polybutylene terephthalates which have an intrinsic viscosity of from 0.2 to 1.4 dl/g (determined on a 0.5% by weight solution in a mixture of phenol and tetrachloroethane in proportions by weight of 1:1 at 25° C.) from mono- and/ or bis(hydroxybutyl) esters of tetephthalic acid or from low viscosity polybutylene terephthalate in a reaction which is mainly determined by the transport of material and which takes place in the liquid phase and/or at the interface between the molten reactants and the volume of gas, at 160° to 360° C., characterized in that the molten starting components together with a heated inert gas are conducted in a diphasic annular (circular) stream through an externally heated spiral tube (with mainly constant pitch) having a diameter of from 3 to 100 mm, preferably from 40 to 50 mm, and a diameter/length ratio of from 1:400 to 1:2000 by the maintenance of a pressure difference between the beginning and the end of the reaction tube, under conditions such that the absolute pressure measured at the point of entry of the reaction mixture into the tube is from 1 to 100 bar, preferably from 1 to 30 bar, and the viscosity of the annular stream is from 1 to 10,000 poises (measured at the reaction temperature) and a circular stream is produced between the surface of the melt and the wall of the tube by the curvature of the tube and a gas stream at a velocity of from 20 to 300 m/sec in order to accelerate the transport of material between the melt and the inert gas. The quantity of inert gas required for producing the diphasic annular stream and transporting the melt depends mainly on the diameter of the tube and the viscosity, surface tension and density of the melt. The annular stream produces a thin layer of the melt on the internal wall of the tube, which powerfully assists the transport of reaction products which have been split off, i.e. especially methanol and butane-1,4-diol. The short average residence time thereby obtained, which is generally less than 15 minutes, preferably from 1 to 5 minutes, greatly restricts the formation of tetrahydrofuran and the degradation of polybutylene terephthalate.

The ratio of the diameter and spiral diameter of the reaction tube is generally from 0.01 to 0.5, preferably from 0.05 to 0.15.

Whereas polybutylene terephthalates of the prior art generally have a molecular non-uniformity (heterogenity index) $U = (M_w/M_n) - 1$ of about 1.15 ($M_w$ = weight average molecular weight, $M_n$ = number average molecular weight, $U$ = molecular non-uniformity), it is possible according to the process of the invention to manufacture polybutylene terephthalates having a molecular non-uniformity of below 1.10.

Furthermore, the process of the invention yields polybutylene terephthalates having a carboxyl group content —dependent on the viscosity—in ranges shown in the diagram, e.g. (intrinsic viscosities determined as above described):

| intrinsic viscosity | 0.45 | 0.6 | 0.8 | 1.0 | 1.3 | dl/g |
|---|---|---|---|---|---|---|
| % b.w. COOH | | | | | | |
| upper limit | 0.035 | 0.041 | 0.051 | 0.07 | 0.095 | |
| lower limit | 0.025 | 0.028 | 0.033 | 0.04 | 0.055 | |
| preferably equal to or below | 0.03 | 0.034 | 0.04 | 0.05 | 0.075 | |

The carboxyl group content can—if desired—be calculated in milliequivalents per kilogram polybutylene terephthalate according to the equation 1 mval/kg = 0.0045% by weight COOH.

Accordingly, the invention provides polybutylene terephthalates having an intrinsic viscosity (determined at 25° C. on a 0.5% by weight solution in a 1:1 by weight mixture of phenol and tetrachloroethane) of from 0.2 to 1.4 dl/g, a molecular non-uniformity of below 1.10, and a carboxyl group content equal to or below 0.07% by weight, based on the polybutylene terephthalate, determined at an intrinsic viscosity of 1.0 dl/g.

A preferred embodiment of the invention provides polybutylene terephthalates having an intrinsic viscosity of from 0.2 to 1.4 dl/g, a molecular non-uniformity of below 1.10, and a carboxyl group content equal to or below 0.05% by weight, based on the polybutylene terephthalate, determined at an intrinsic viscosity of 1.0 dl/g.

If a viscosity different from 1.0 dl/g is obtained, the corresponding maximum carboxyl group content according to the invention can be taken from the diagram.

Furthermore, the invention provides polybutylene terephthalates obtainable according to the above-described continuous process in a spiral reaction tube. The term "obtainable" in this context means products obtained in this process and products having the same structure as those obtained in this process.

The preparation of terephthalic acid mono- and bis-(hydroxybutyl) esters may be carried out by transesterification of dimethyl terephthalate or by esterification of terephthalic acid with butane-1,4-diol. Methods of carrying out these reactions are already known. Both transesterification and esterification and polycondensation are generally carried out in the presence of catalysts such as those described by R. E. Wilfong in J. Polym. Sci. 54 (1961). The most preferred catalysts are titanium compounds, e.g. tetraalkyltitanic acid esters which have from 1 to 10 C-atoms in each alkyl group, such as tetraisopropyl titanate and tetrabutyl titanate. The catalysts may be used in quantities of from 0.001 to 0.2% by weight, based on the dicarboxylic acid component.

The terms "terephthalic acid mono- and/or bis-(hydroxybutyl) esters" and "polybutylene terephthalate", in the context of this invention, mean products in which the dicarboxylic acid component consists of terephthalic acid, up to 10 mol % of which, based on the acid component, may be replaced by other aromatic dicarboxylic acids which have from 6 to 14 C-atoms, by aliphatic dicarboxylic acids having from 4 to 8 C-atoms, or by cycloaliphatic dicarboxylic acids having from 8 to 12 C-atoms, and in which the diol component consists of butane-1,4-diol, up to 10 mol % of which may be replaced by other aliphatic diols having from 2 to 8 C-atoms, cycloaliphatic diols having from 6 to 15 C-atoms or aromatic diols having from 6 to 21 C-atoms. Phthalic acid, isophthalic acid, naphthalene-2,6-dicarboxylic acid, diphenyl-4,4'-dicarboxylic acid, adipic acid, sebacic acid and cyclohexane diacetic acid are preferred examples of such dicarboxylic acids.

Preferred examples of diols of the kind defined above include ethylene glycol, propane-1,3-diol, pentane-1,5-diol, hexane-1,6-diol and cyclohexane-1,4-dimethanol.

The polybutylene terephthalates may, of course, be branched by trihydric or tetrahydric alcohols or by tribasic or tetrabasic acids, as described, for example, in German Offenlegungsschrift No. 1,900,270 (U.S. Pat. No. 3,692,744). Preferred branching agents include, for example, trimesic acid, pyromellitic acid, trimethylolpropane and -ethane, and pentaerythritol. It is advisable not to add more than 1 mol % of branching agent, based on the quantity of acid component.

The polycondensation process according to the invention may generally be carried out at temperatures of from 240° to 300° C., preferably at 250° to 270° C., if oligomeric polybutylene terephthalate having an intrinsic viscosity of $\geq 0.2$ dl/g is used. If terephthalic acid mono- and bis-(hydroxybutyl)esters and oligomers having an intrinsic viscosity below 0.2 dl/g are to be used as starting materials, a reaction temperature of from 160° to 240° C. may also be used.

If a relatively high increase in viscosity is desired, it may be advantageous to carry out the reaction in two or more stages on account of the high concentration of volatile reaction products (butane diol) in the stream of inert gas and the different reaction temperatures required.

The quantity of heat required for the reaction is mainly supplied to the reaction mixture through a heated external jacket.

A vacuum may, of course, be applied to the end of the reaction tube to assist the transport of material.

Throughout the specification 1.1.2.2-tetrachloroethane is meant by "tetrachloroethane".

The viscosity of the products obtained according to the invention depends on the viscosity of the starting material, the residence time, and the film thickness of the resin in the reaction tube. The residence time, in turn, depends on the rate of throughput, the velocity of the gas stream, the tube length, and the fall in pressure; for general considerations see C. Casper, Chem. Ing. Technik 42, 349–354 (1970).

The intrinsic viscosities determined as above described can be correlated to the relative viscosities determined a) on a 1 g per 100 ml solution in a 60/40% by weight phenol/1.1.2.2-tetrachloroethane mixture and b) on a 0.5 g per 100 ml solution in a 60/40% by weight phenol/o-dichlorobenzene mixture as follows:

| intrinsic viscosity [dl/g] | relative viscosity | |
|---|---|---|
| | a | b |
| 0.45 | 1.45 | 1.23 |
| 0.72 | 1.82 | |
| 0.75 | 1.89 | 1.41 |
| 0.79 | 1.94 | 1.43 |
| 1.01 | 2.29 | 1.56 |
| 1.24 | | 1.71 |

The invention is illustrated by the following Examples:

EXAMPLE 1

Dimethyl terephthalate and butane-1,4-diol were mixed in a molar ratio of 1:1,4 and trans-esterified under nitrogen at 200° C. in the presence of 0.01% by weight, based on the quantity of dimethyl terephthalate put into the process, of titanium tetrabutylate. The transesterification product was heated to 265° C. and fed into a spiral coil tube 15 mm in diameter and 12 m in length (spiral diameter 15 cm) at a rate of 9.7 kg/h and a pressure of 3 bar together with a stream of nitrogen which had been preheated to 265° C. At the end of the coil tube, the molten polybutylene terephthalate was separated from the stream of nitrogen which was loaden with reaction products which had split off and excess butane diol. The polymer melt was cooled in water and then broken down into small pieces (see Table).

EXAMPLES 2 and 3

Polybutylene terephthalates having intrinsic viscosities of 0.52 and 0.79 dl/g (determined on a 0.5% by weight solution in phenol/tetrachloroethane 1:1 at 25° C.) were polycondensed to more highly viscous polybutylene terephthalates by the method described in Example 1 (see Table).

Table

| Example | 1 | 2 | 3 |
|---|---|---|---|
| Starting material Intrinsic viscosity [dl/g] | 0.1 | 0.52 | 0.79 |
| End product Intrinsic viscosity [dl/g] | 0.45 | 0.79 | 1.01 |
| COOH content [%] | 0.03 | 0.04 | 0.05 |
| Polycondensation [°C.] temperature | 240 | 268 | 266 |
| Rate of throughput [kg/h] | 9.7 | 5.7 | 3.6 |
| non-uniformity | 1.03 | 1.03 | 1.05 |

We claim:

1. Polybutylene terephthalates having an intrinsic viscosity (determined at 25° C. on a 0.5% by weight solution in a 1:1 by weight mixture of phenol and tetrachloroethane) of from 0.2 to 1.4 dl/g, a molecular non-uniformity of below 1.10, and a carboxyl group content equal to or below 0.07% by weight, based on the polybutylene terephthalate, determined at an intrinsic viscosity of 1.0 dl/g.

2. Polybutylene terephthalates according to claim 1, characterized in that they have a carboxyl group content equal to or below 0.05% by weight, based on the polybutylene terephthalate, determined at an intrinsic viscosity of 1.0 dl/g.

3. A continuous process for the production of polybutylene terephthalate which comprises transporting a molten reaction mixture of terephthalic acid mono- and/or bis-(hydroxybutyl) ester or low viscosity polybutylene terephthalate at 160° to 300° C., together with a heated inert gas, in a diphasic annular stream through an externally heated spiral reaction tube (of substantially constant pitch) having a diameter of from 3 to 100 mm and a diameter/length ratio of from 1:400 to 1:2000 by the maintenance of a pressure difference between the beginning and end of the reaction tube, under conditions such that the absolute pressure, determined at the point of entry of the reaction mixture into the tube, is from 1 to 100 bar and the viscosity of the annular stream is from 1 to 10,000 poises (determined at the reaction temperature), and a circular stream between the surface of the melt and the wall of the tube is produced by the curvature of the tube and a stream of gas flowing at a velocity of from 20 to 300 m/sec to accelerate the transport of material between the melt and the inert gas, whereby reaction takes place in the liquid phase and/or at the melt/gas interface.

4. A process as claimed in claim 3, wherein the reaction tube diameter is from 40 to 50 mm.

5. A process as claimed in claim 3, wherein the absolute pressure at the point of entry of the reaction mixture into the tube is from 1 to 30 bar.

6. Polybutylene terephthalates obtainable by a process as claimed in claim 3.

* * * * *